US012720285B2

(12) United States Patent
Das et al.

(10) Patent No.: US 12,720,285 B2
(45) Date of Patent: Aug. 25, 2026

(54) DIRECTIONAL WIRELESS MESSAGE TRANSMISSION

(71) Applicant: QUALCOMM Incorporated, San Diego, CA (US)

(72) Inventors: Soumya Das, San Diego, CA (US); Mohammad Nekoui, San Diego, CA (US); Abha Khosla, San Diego, CA (US)

(73) Assignee: QUALCOMM Incorportated, San Diego, CA (US)

(*) Notice: Subject to any disclaimer, the term of this patent is extended or adjusted under 35 U.S.C. 154(b) by 1003 days.

(21) Appl. No.: 17/890,830

(22) Filed: Aug. 18, 2022

(65) Prior Publication Data

US 2024/0064498 A1 Feb. 22, 2024

(51) Int. Cl.
*H04W 4/40* (2018.01)
*H04W 16/28* (2009.01)

(52) U.S. Cl.
CPC ............ *H04W 4/40* (2018.02); *H04W 16/28* (2013.01)

(58) Field of Classification Search
CPC ................................ H04W 4/40; H04W 16/28
USPC .......................................................... 455/500
See application file for complete search history.

(56) References Cited

U.S. PATENT DOCUMENTS 10,921,810 B2 * 2/2021 Kutila ............ B60W 30/18163
10,971,008 B2 * 4/2021 Gogic .................... H04L 67/12
11,297,136 B2 * 4/2022 Higuchi .............. H04L 67/1097
11,638,237 B2 * 4/2023 Choi ..................... H04L 27/261
370/329
12,366,632 B2 * 7/2025 Kumari ................... G01S 13/75
12,488,687 B2 * 12/2025 Das ........................ H04W 4/46
2002/0123327 A1 * 9/2002 Vataja .................. H04W 4/029
455/412.1
2002/0168958 A1 * 11/2002 Ford ..................... H04W 76/50
455/566
2010/0179764 A1 * 7/2010 Kuramori ............ B60W 40/08
702/19
2015/0264538 A1 * 9/2015 Klang ..................... H04W 4/12
455/457
2018/0113472 A1 * 4/2018 Sakr ..................... G05D 1/0276
2019/0261201 A1 * 8/2019 Hutchins .............. H04W 24/04
2019/0394159 A1 * 12/2019 Gosalia .................. H04L 51/48

(Continued)

OTHER PUBLICATIONS

ALI.G.G.MD.N., et al., "Feedbackless Relaying for Enhancing Reliability of Connected Vehicles", IEEE Transactions on Vehicular Technology, IEEE, USA, vol. 69, No. 5, Mar. 13, 2020, pp. 4621-4634, XP011788366, p. 4623, Right-hand column-p. 4625, Left-hand column.

(Continued)

*Primary Examiner* — April G Gonzales
(74) *Attorney, Agent, or Firm* — Holland & Hart LLP

(57) ABSTRACT

A directional wireless message transmission method includes: receiving wirelessly, at a wireless communication device from a first region relative to the wireless communication device, one or more signals corresponding to a first vehicle; and transmitting a message, based on the one or more signals corresponding to the first vehicle, from the wireless communication device to a second region relative to the wireless communication device based on the one or more signals being unable to be received in the second region relative to the wireless communication device.

28 Claims, 11 Drawing Sheets

(56) References Cited

U.S. PATENT DOCUMENTS

| | | | | |
|---|---|---|---|---|
| 2020/0037131 | A1* | 1/2020 | Hieu Nguyen | H04W 16/28 |
| 2020/0122743 | A1* | 4/2020 | Badigannavar | G08G 1/147 |
| 2020/0236521 | A1* | 7/2020 | Vassilovski | G08B 29/188 |
| 2020/0260240 | A1* | 8/2020 | Lee | H04W 4/02 |
| 2021/0112386 | A1* | 4/2021 | Lee | H04W 40/22 |
| 2021/0197846 | A1* | 7/2021 | Thakur | B60Q 1/545 |
| 2021/0409930 | A1* | 12/2021 | Kalhan | H04L 1/1896 |
| 2023/0133248 | A1* | 5/2023 | Mishra | G08G 1/202<br>701/29.3 |
| 2023/0199449 | A1* | 6/2023 | Katta | H04W 4/44<br>370/310 |
| 2023/0236324 | A1* | 7/2023 | Klochikhin | G01S 19/05 |
| 2023/0319527 | A1* | 10/2023 | Shuman | H04W 4/40<br>370/252 |
| 2024/0064498 | A1* | 2/2024 | Das | H04W 4/46 |

OTHER PUBLICATIONS

Gao Y., et al., "BSM Dissemination with Network Coded Relaying in VANETs at NLOS Intersections", 2017 IEEE International Conference on Communications (ICC), IEEE, May 21, 2017, 6 Pages, XP033132306, p. 2-5.

International Search Report and Written Opinion—PCT/US2023/027907—ISA/EPO—Nov. 9, 2023.

* cited by examiner

| Vehicle sensor content | Vehicle ID | V2X enabled | WCD content |
|---|---|---|---|
| Vehicle 1 content | Vehicle A | 1 | Lane-level data |
| Vehicle 2 content | Vehicle B | 0 | Lane-level data |

DIRECTIONAL WIRELESS MESSAGE TRANSMISSION

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example directional wireless message transmission method includes: receiving wirelessly, at a wireless communication device from a first region relative to the wireless communication device, one or more signals corresponding to a first vehicle; and transmitting a message, based on the one or more signals corresponding to the first vehicle, from the wireless communication device to a second region relative to the wireless communication device based on the one or more signals being unable to be received in the second region relative to the wireless communication device.

An example wireless communication device includes: a memory; a transceiver including a first directional antenna and a second directional antenna; and a processor communicatively coupled to the memory and the transceiver and configured to: receive, via the first directional antenna from a first region relative to the wireless communication device, one or more signals corresponding to a first vehicle; and transmit, via the second directional antenna toward a second region relative to the wireless communication device, a message based on the one or more signals corresponding to the first vehicle, wherein the processor is configured to transmit the message based on the one or more signals being unable to be received in the second region relative to the wireless communication device.

Another example wireless communication device includes: means for wirelessly receiving, from a first region relative to the wireless communication device, one or more signals corresponding to a first vehicle; and means for transmitting a message, based on the one or more signals corresponding to the first vehicle, from the wireless communication device to a second region relative to the wireless communication device based on the one or more signals being unable to be received in the second region relative to the wireless communication device.

An example non-transitory, processor-readable storage medium includes processor-readable instructions to cause a processor of a wireless communication device to: receive wirelessly, from a first region relative to the wireless communication device, one or more signals corresponding to a first vehicle; and transmit a message, based on the one or more signals corresponding to the first vehicle, from the wireless communication device to a second region relative to the wireless communication device based on the one or more signals being unable to be received in the second region relative to the wireless communication device.

DETAILED DESCRIPTION

Figure 1:
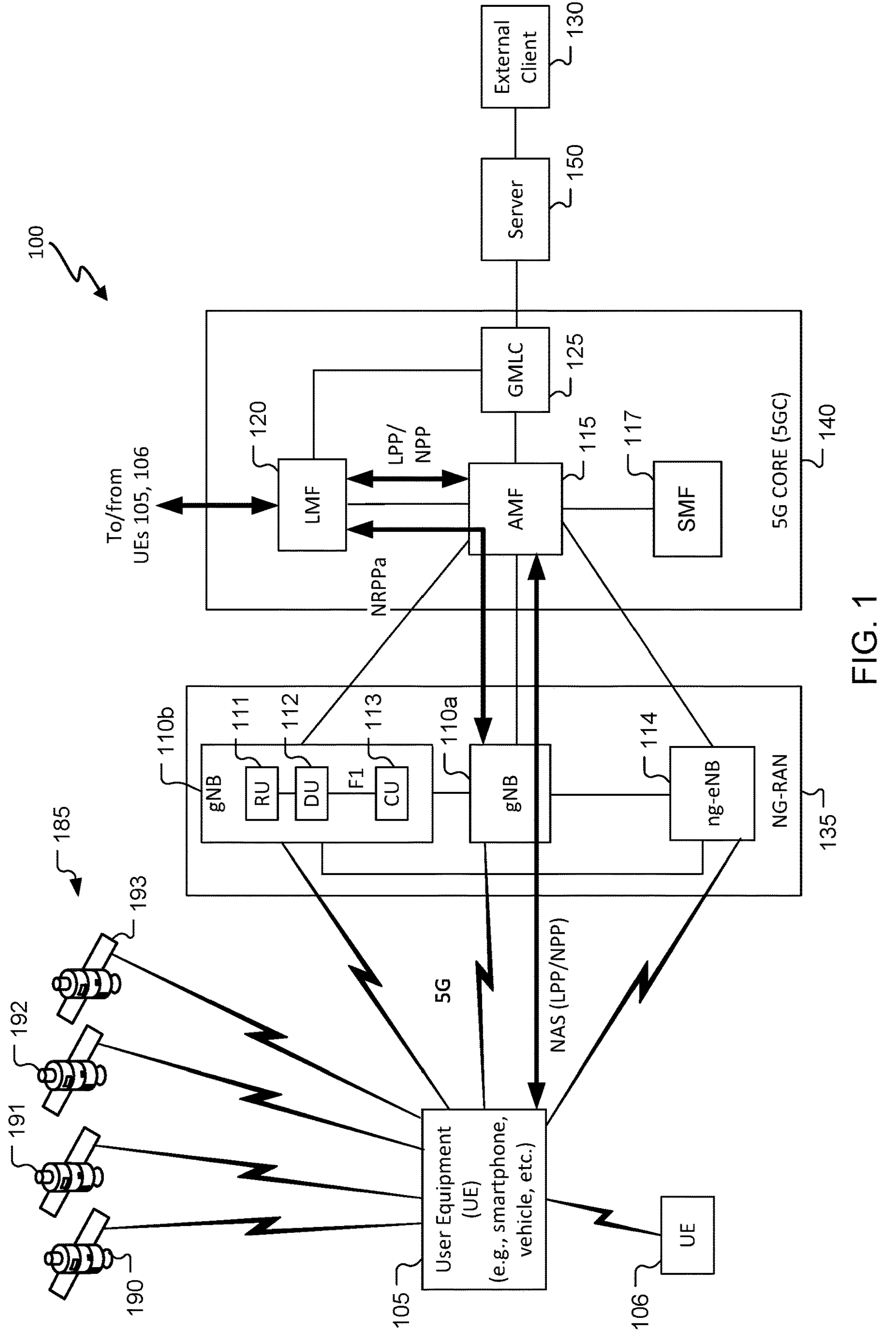
FIG. 1 is a simplified diagram of an example wireless communications system.

Techniques are discussed herein for directional transmission of information regarding a first region to a second region that is at least partly NLOS with the first region. For example, a wireless communication device (e.g., a roadside unit, a mobile edge computing device, a vehicle, etc.) may obtain information regarding the first region (e.g., a portion of a first road near an intersection of roads) and transmit that information to the second region (e.g., another portion of another road near the intersection). The information may be safety data supplied by one or more vehicles in the first region, one or more images captured of the first region (e.g., by the wireless communication device or another device that provides the image(s) to the wireless communication device). The wireless communication device may provide the information to the second region through directed communication, and may provide information in one or more live feeds of information, each feed corresponding to a respective region. A vehicle may transmit the information to the second region, and may abstain from doing so if the information is previously transmitted (e.g., by another vehicle), and may hand off responsibility for transmitting the information (e.g., if the vehicle cannot or soon will not be able to transmit the information effectively to the second region and/or collect the information effectively from the first region). Other configurations, however, may be used.

Items and/or techniques described herein may provide one or more of the following capabilities, as well as other capabilities not mentioned. A first vehicle that is non-line-of-sight with respect to a second vehicle may receive information about the second vehicle that may be used to prevent a collision or otherwise affect movement of the first vehicle. Vehicle safety may be improved. Autonomous vehicle driving may be improved (e.g., made safer, made to more efficiently move vehicles through an intersection, etc.). Information may be better provided regarding a first geographic region regarding a second geographic region (e.g., object movement within the second geographic region) where the first and second regions are non-line-of-sight with respect to each other. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN

135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110*a*, 110*b* and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110*a*, 110*b* and/or the ng-eNB 114 may be configured to communicate with the UE 105 via multiple carriers. Each of the gNBs 110*a*, 110*b* and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multicarrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g., the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*b* includes an RU 111, a DU 112, and a CU 113. The RU 111, DU 112, and CU 113 divide functionality of the gNB 110*b*. While the gNB 110*b* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*b*. The DU 112 hosts the Radio Link Control (RLC), Medium Access Control (MAC), and physical layers of the gNB 110*b*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*b*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the UE's position.

Figure 2:
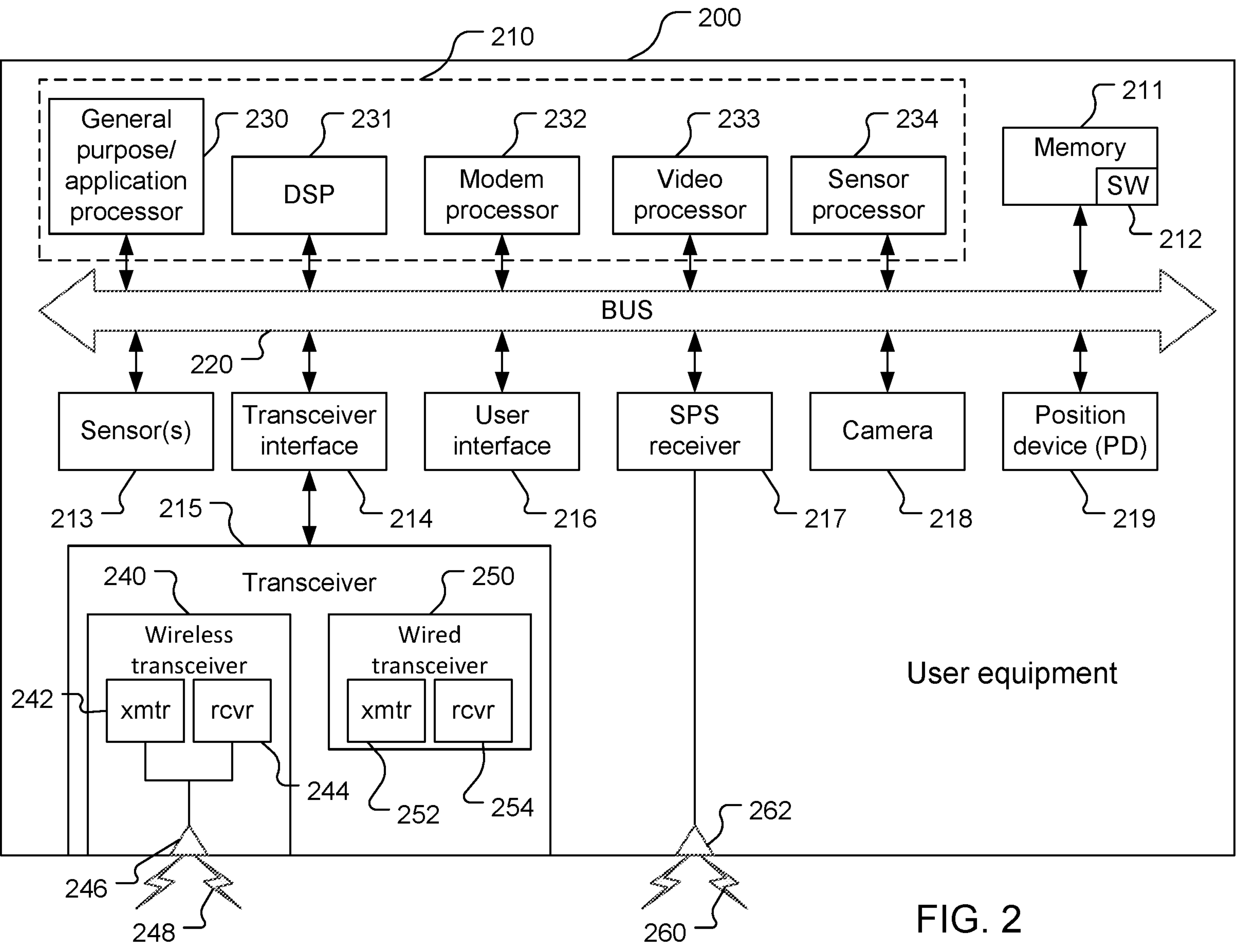
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface

214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be unconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
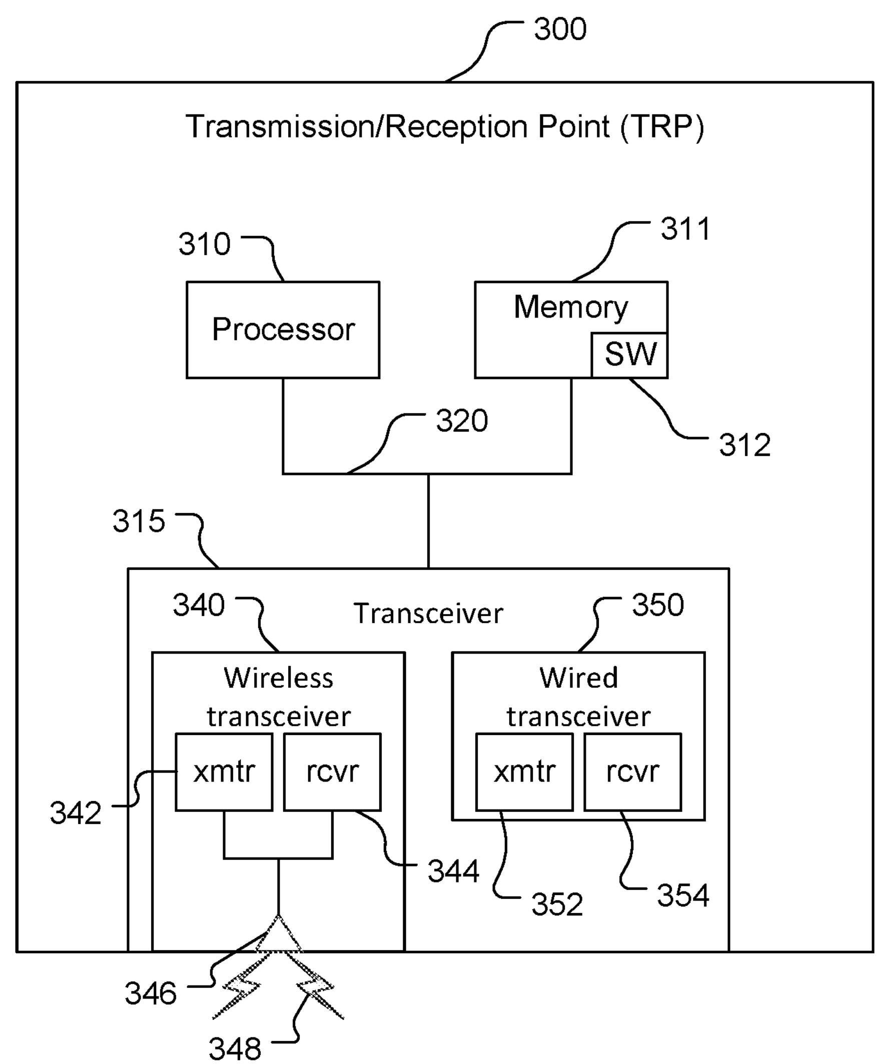
FIG. 3 is a block diagram of components of an example transmission/reception point.

Referring also to FIG. 3, an example of a TRP 300 of the gNBs 110*a*, 110*b* and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110*a*, 110*b* and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
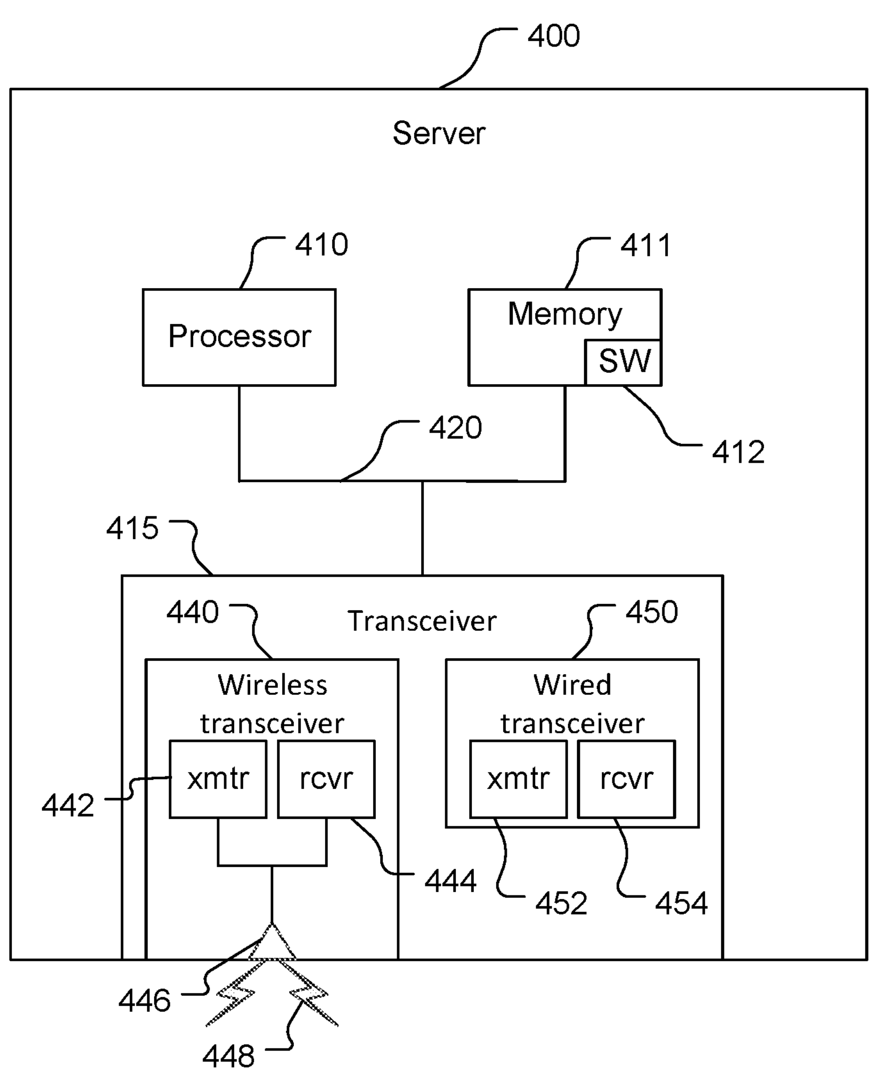
FIG. 4 is a block diagram of components of a server, various examples of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
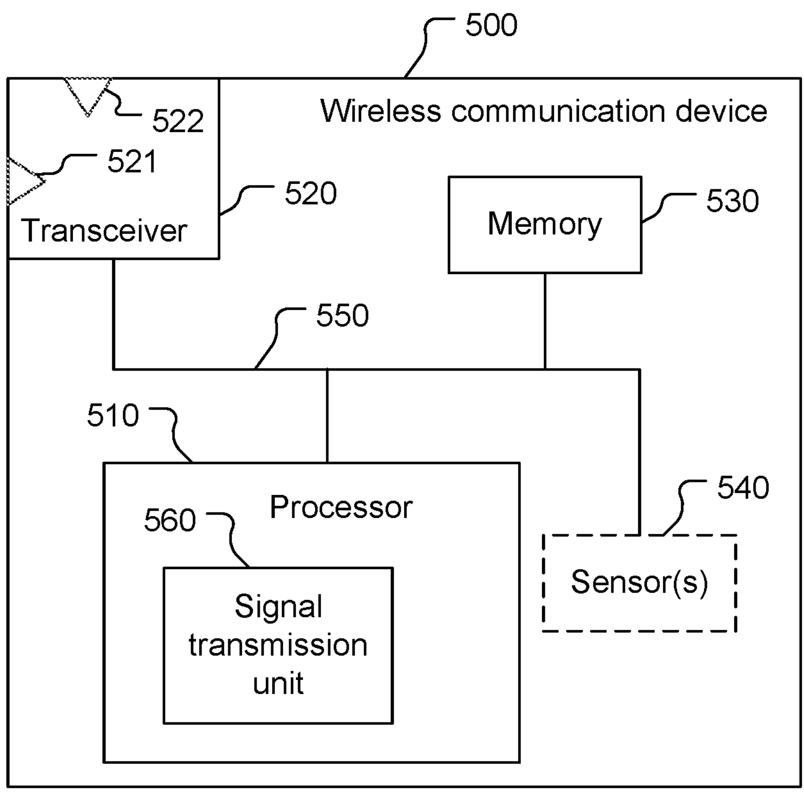
FIG. 5 is a block diagram of an example wireless communication device.

Referring to FIG. 5, a wireless communication device 500 includes a processor 510, a transceiver 520, a memory 530, and optionally one or more sensors 540, communicatively coupled to each other by a bus 550. The transceiver 520 includes directional antennas 521, 522. The directional antennas 521, 522 are configured to have antenna beams with limited fields of view, i.e., not omnidirectional. The directional antennas 521, 522 may each transmit greater power to and/or receive greater power from one or more directions compared to one or more other directions. This may help the directional antennas 521, 522 provide increased performance with less interference compared to omnidirectional antennas. The device 500 may include the components shown in FIG. 5, and may include one or more other components. For example, the transceiver 520 may include a wireless transmitter and a wireless receiver configured for wireless communication, via the antennas 521, 522, with one or more other devices such as a UE. The device 500 may be any of a variety of devices or a portion of any of a variety of devices, such as an RSU (roadside unit), a vehicle, etc. As part of an RSU, the device 500 may lack components for connecting to a core network. The device 500 may be similar to the TRP 300, and may include components for connecting to a core network, e.g., if the device 500 is a mobile edge computing (MEC) device. The transceiver 520 may be configured to transmit one or more communication signals, e.g., V2V signals, V2X signals (e.g., C-V2X signals).

In the example shown in FIG. 5, the transceiver 520 includes the two directional antennas 521, 522, with the antennas 521, 522 having respective boresights that are orthogonal to each other. This configuration is an example, and other configurations of the transceiver 520 may be used. For example, more than two antennas may be used. As another example, antennas may be directed in different relative directions (e.g., opposite directions (i.e., 180° from each other)). The transceiver 520 (including one or more antennas) may be configured to send and receive a variety of communication signals, e.g., V2X signals over a PC5 interface, signals over a Uu interface, etc.

The description herein may refer to the processor 510 performing a function, but this includes other implementations such as where the processor 510 executes software (stored in the memory 530) and/or firmware. The description herein may refer to the device 500 performing a function as shorthand for one or more appropriate components (e.g., the processor 510 and the memory 530) of the device 500 performing the function. The processor 510 (possibly in conjunction with the memory 530 and, as appropriate, the transceiver 520) may include a signal transmission unit 560. The signal transmission unit 560 is discussed further below, and the description may refer to the processor 510 generally, or the device 500 generally, as performing any of the functions of the signal transmission unit 560, with the device 500 being configured to perform the functions.

Figure 6:
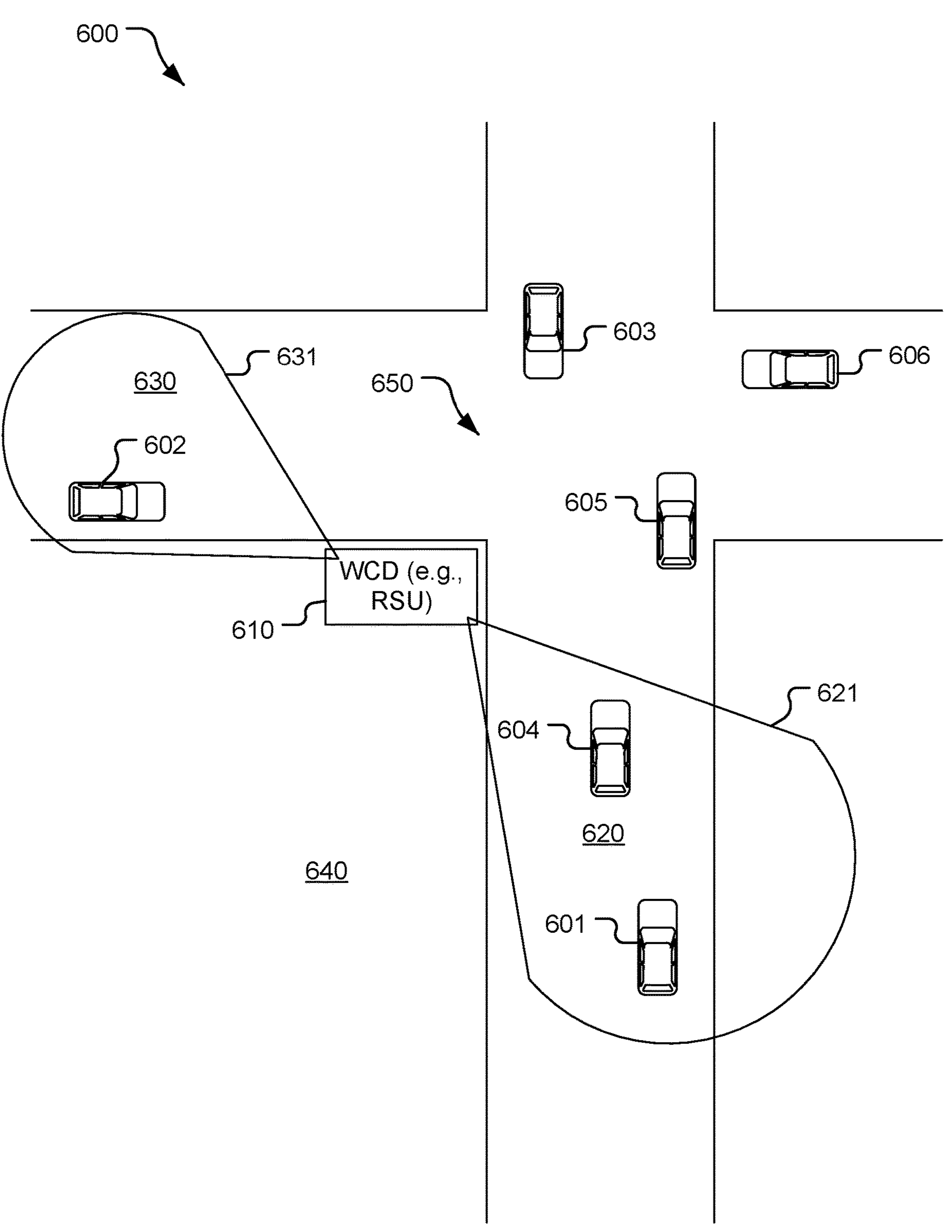
FIG. 6 is a diagram of an example wireless communication environment.

Referring also to FIG. 6, a wireless communication environment 600 includes multiple mobile wireless communication devices, here vehicles 601, 602, 603, 604, 605, 606, and a wireless communication device 610. The wireless communication device 610 is an example of the wireless communication device 500, and in this example is an RSU. The device 610 is disposed at a location where multiple regions relative to the device 610 are visible, with the multiple regions being non-line of sight (NLOS) with respect to each other. In the example shown, the device 610 is configured to transmit signals to and receive signals from a first region 620 and a second region 630, corresponding to respective directional antennas of the device 610. The device 610 may transmit signals in beams 621, 631 that are aligned with (e.g., steered to) the regions 620, 630, respectively. A region 640 may be occupied by buildings and/or other structures and/or one or more other objects (natural or human made) that inhibit line of sight between the regions 620, 630. Consequently, vehicles approaching an intersection 650 (e.g., the vehicle 602) may not be able to hear (e.g., receive and adequately process signals from) one or more other vehicles near the intersection 650 (e.g., the vehicles 601, 604). The vehicle 602 may not be able to receive and process V2X signals (e.g., basic safety messages (BSMs) or Collective Perception Messages (CPMs) or Sensor Data Sharing Messages (SDSMs)) through direct UE-to-UE communication (e.g., over a PC5 interface) from the vehicles 601, 604 until the vehicles 601, 602, 604 are very close to the intersection 650, which may be too late for effective use of the information in the V2X signals. Placing the wireless communication device 610 in a position, and steering one or more beams as appropriate, to communicate with wireless communication devices that are unable to communicate with each other directly may help the wireless communication device 610 enable and/or facilitate communication between the vehicle 602 and the vehicles 601, 604 well before the vehicles 601, 602, 604 reach the intersection 650.

Figure 7:
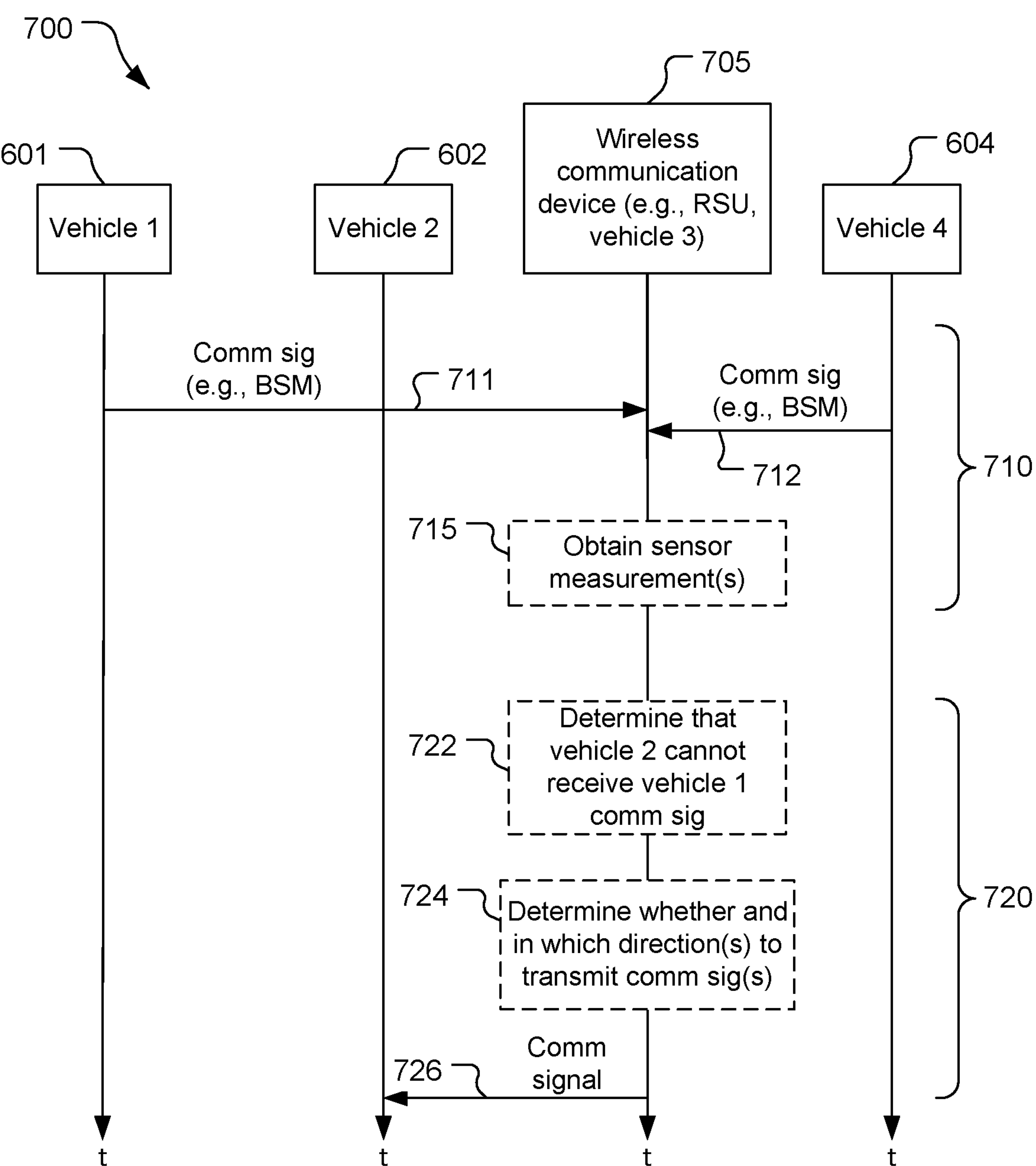
FIG. 7 is a processing and signal flow diagram of message transmission between wireless communication devices.

Referring to FIG. 7, with further reference to FIGS. 1-6, a signaling and process flow 700 for message transmission, in particular V2X signal relay, includes the stages shown. The flow 700 is an example of interaction between the vehicle 601, the vehicle 602, a wireless communication device 705, and possibly the vehicle 604. The flow 700 is an example, and may be altered. For example, stages may be added to the flow 700, rearranged, and/or removed.

Figure 8:
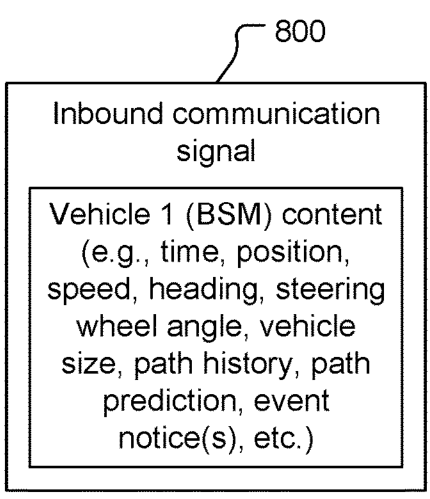
FIG. 8 is an example of an inbound communication signal shown in FIG. 7.

At stage 710, the wireless communication device 705 obtains information regarding a region of an environment containing the device 705. In this example, the device 705 obtains, using one or more directional devices, one or more sensor measurements made by the vehicle 601, may obtain one or more sensor measurements made by the vehicle 604, and may obtain one or more sensor measurements using one or more directional sensors of the device 705. Each directional device (e.g., directional antenna, directional sensor (e.g., camera)) is configured to collect information (e.g., receive communication signals, make radar measurements, capture images, etc.) from a limited field of view about the device 705. For example, the vehicle 601 and possibly the vehicle 604 may transmit signals, such as communication signals 711, 712, that the device 705 receives using respective directional antennas. In this case, the communication signals 711, 712 are vehicle sensor messages each indicative of one or more sensor measurements that may provide information relevant to traffic management, e.g., collision avoidance. The communication signals 711, 712 may be any of a variety of signals. For example, referring also to FIG. 8, an inbound communication signal 800 is an example of each of the communication signals 711, 712. The inbound communication signal 800 comprises, in this example, a basic safety message (BSM) that includes information such as time, vehicle location, vehicle location accuracy, vehicle motion (speed, heading, acceleration, and/or yaw rate), steering wheel angle, transmission state, brake system status, vehicle size (length, width, weight), vehicle path history, predicted vehicle path, one or more event notifications (e.g., hard braking, traction control, etc.), and/or exterior light status, etc.

At sub-stage 715, the device 705 may obtain one or more sensor measurements. For example, one or more of the sensor(s) 540 of the device 705 may make one or more respective measurements. For example, one or more cameras may each capture one or more images of respective regions visible from the device 705 (e.g., by receiving and processing visible-light signals corresponding to (e.g., reflected by) an object such as a vehicle). As another example, the device 705 may make one or more radar, lidar, and/or ultrasound measurements. The measurement(s) may, for example, reveal object presence and possibly object movement. The measurement(s) may be analyzed to determine, for example, vehicle presence and location (e.g., which lane a vehicle is in), vehicle motion, and/or predicted vehicle presence (e.g., a time span during which a vehicle will be in the intersection 650 and a path through the intersection that the vehicle may take).

At stage 720, the wireless communication device 705 transmits a communication signal 726, based on information obtained at stage 710, to a region that is NLOS with the region from which the information was obtained at stage 710. In this example, the device 705 transmits the communication signal 726 to the vehicle 602. A vehicle, here the vehicle 601, from which a communication signal originates may be referred to as the origin vehicle and a vehicle, here the vehicle 602, that receives the communication signal 726 from the device 705 may be referred to as the destination vehicle. The device 705 may transmit the communication signal 726 based on one or more factors discussed below with respect to sub-stage 722 and/or sub-stage 724.

At optional sub-stage 722, the device 705 may determine that a vehicle, e.g., the vehicle 602, cannot receive a communication signal from another vehicle, e.g., the communication signal 711 from the vehicle 601. For example, the processor 510 may assess information regarding the environment 600, e.g., camera images, geometry of the environment 600 (e.g., character of objects in the region 640 (e.g., RF penetration of buildings, trees, etc.)), location of the origin vehicle and location of the destination vehicle and calculate a path loss between the origin vehicle and the destination vehicle. If the path loss is above a threshold that will yield a receive power at the destination vehicle below a threshold for accurate signal reception and decoding, then the device 705 may conclude that the vehicle 602 cannot receive the signal 711 from the vehicle 601 and consider the vehicles 601, 602 to be NLOS. Also or alternatively, the device 705 may assess historical data regarding vehicle locations and signal reception. The device 705 may obtain (e.g., build or receive) historical data such as a heat map of transmit and receive locations and signal reception quality.

At optional sub-stage 724, the device 705 may determine whether and in which direction(s) to transmit the communication signal 726 based on the communication signal 712 (and/or one or more other received communication signals and/or other information (e.g., one or more sensor measurements, one or more processed sensor measurements (e.g., one or more images), etc.)). For example, the determination to transmit the communication signal 712 may be the determination that the vehicle 602 cannot receive the communication signal 712. Alternatively, one or more factors may be evaluated in addition to or instead of the determination that the vehicle 602 cannot receive the communication signal 712 in order to determine whether to transmit the communication signal 726. Such factors may include V2X vehicle density, dynamics of one or more approaching vehicles, RF characteristics of the environment 600, and/or message lifetime. For example, the higher the V2X-enabled vehicle density in the environment 600, the less likely the processor 510 may be to transmit the communication signal 726 (e.g., to help reduce and/or avoid over-the-air (OTA) congestion). As another example, the processor 510 may assess the relative speed and distance of vehicles, e.g., the vehicles 601, 602 to determine a risk that one vehicle poses to another or that the vehicles pose to each other. The processor 510 may favor transmission of the signal 726 based on the risk being higher than a threshold risk. The processor 510 may, for example, use one or more cameras to determine a lane in which the vehicle 601 is disposed, determine an expected path of the vehicle 601 (e.g., an ingress lane of the vehicle 601 as the vehicle 601 is expected enter the intersection 650 and/or an egress lane of the vehicle 601 as the vehicle is expected to leave the intersection 650), and use this information, and possibly similar information for the vehicle 602, to assess the risk of collision of the vehicles 601, 602. The processor 510 may also or alternatively evaluate the RF characteristics of the environment 600 such as the geometry of the intersection 650, to what extent objects in the environment 600 block LOS between vehicles on intersecting roads, and/or the presence of out-of-band emissions (DOBE), such as Wi-Fi signals, that might interfere with desired signals (e.g., V2X signals such as C-V2X signals). The processor 510 may favor transmission of the signal 726 if propagation loss between vehicles on intersecting roads is higher than a threshold (or would result in lower than a threshold power at a destination vehicle) and/or that DOBE is above a threshold level (indicating compromised desired signals due to interference). The processor 510 may also or alternatively evaluate whether the information from the origin vehicle, e.g., in the communication signal 711, is or will still be useful to the destination vehicle. For example, the processor 510 may determine whether more than a threshold amount of time will remain in a lifetime of content of the communication signal 711 by the time the communication signal 726 will reach the destination vehicle, here the vehicle 602, considering OTA transit time, processing time in the device 705, etc. A communication signal such as a BSM may have a lifetime of about 100 ms-200 ms, and if the present remaining lifetime minus OTA transit time minus processing time in the device 705 will leave less than a threshold amount of the lifetime (e.g., such that a new BSM will be available before the present BSM can be processed by the destination vehicle), then the device 705 may determine not to transmit the communication signal 726 (e.g., not to relay the signal 711). The device 705 may determine in which direction(s) to transmit the communication signal 726, e.g., based on in which directions receivers may not adequately receive the communication signal 711 and/or based on direction(s) in which vehicles may be at more than a threshold risk from the vehicle 601 and/or pose more than a threshold risk to the vehicle 601.

Figure 9:
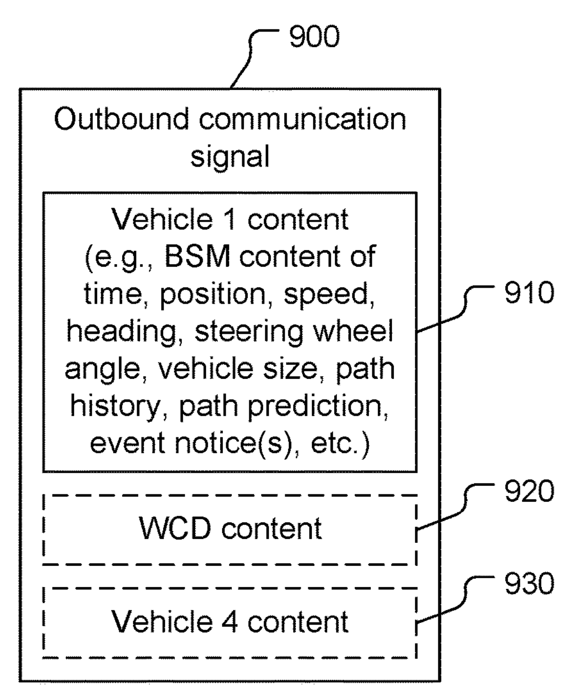
FIG. 9 is an example of an outbound communication signal shown in FIG. 7.

The device 705 may produce the communication signal 726 in a variety of ways, with various content. For example, the device 705 may relay content of the communication signal 711 without analysis (e.g., decoding) of the communication signal 711. Referring also to FIG. 9, an outbound communication signal 900 is an example of the communication signal 726 and includes first vehicle content 910. The first vehicle content 910 is, in this example, vehicle sensor measurement information indicative of one or more sensor measurements performed by a vehicle, e.g., the vehicle 601, and received by the wireless communication device 705 in the message 711. The device 705, e.g., the signal transmission unit 560, may relay the communication signal 711 received from the vehicle 601, and may include WCD content 920 (wireless communication device content). This relay may be a layer 2 relay where the device 705 (e.g., an RSU) removes a layer 2 address in the signal 711 and includes a layer 2 address of the device 705 as part of the WCD content 920 in the communication signal 726. The WCD content 920 may include a layer 2 hop-count field indicating a hop count from the original source of the first vehicle content 910. The device 705 may relay any communication signal, e.g., without assessing whether to relay a received signal, or at least without evaluating some of the factors discussed above (e.g., dynamics of an approaching vehicle and/or message lifetime).

As another example of the device 705 producing the communication signal 726, the wireless communication device 705 may perform an application layer relay of content of the communication signal 711 and possibly content of one or more other communication signals. For example, the device 705, e.g., the signal transmission unit 560, may include vehicle information (e.g., an address) of the origin vehicle, e.g., the vehicle 601, and information for the device 705 (e.g., a device address) in the communication signal 726. The device 705, e.g., the signal transmission unit 560, may decode the communication signal 711 and determine whether to transmit the communication signal 726 based on content of the communication signal 711 (e.g., one or more of the factors discussed above) and/or other information. The device 705 may determine one or more directions in which to transmit the communication signal 726, e.g., to help ensure that vehicles for which the content of the communication signal 726 is relevant receive the communication signal 726 while limiting OTA congestion. The device 705 may aggregate multiple communication signals, e.g., the content of the signals 711, 712, into the communication signal 726 (e.g., with the signal 900 including the first vehicle content 910 and vehicle 4 content 930 from the communication signal 712 from the vehicle 604). This may help reduce OTA congestion (e.g., compared to the device 705 transmitting separate communication signals corresponding to the signal 711 and the signal 712).

By analyzing content of the communication signal 711, the wireless communication device may be able to make intelligent decisions regarding whether and in what direction to transmit the communication signal 726. The device 705 may determine to transmit the communication signal 726 to relevant vehicles and/or in relevant directions, and not transmit the communication signal 726 in irrelevant directions. For example, the device 705 may determine that the vehicle 601 is in a left-turn lane and thus determine to transmit the communication signal 726 toward the region 630 (which is in the expected travel path of the vehicle 601) and not toward a region to the right of the expected travel path of the vehicle 601. As another example, if the vehicle 601 is traveling fast, making reception time important, then the device 705 may transmit the communication signal 726 in all directions, or at least all directions that have a region that is NLOS with the vehicle 601. As another example, if the origin vehicle and the destination vehicle will not be close to being in the intersection 650 concurrently, then the device 705 may not transmit the communication signal 726 (at least not toward the destination vehicle). As another example, if the device 705 determines that there are no vehicles in a relevant region (e.g., the region 630), then the device 705 may not transmit the communication signal 726 to that region, which helps conserve processing power and limit OTA congestion. The signal transmission unit 560 may determine the content of the communication signal 726, e.g., not including information that will not be relevant to a destination vehicle.

Figure 10:
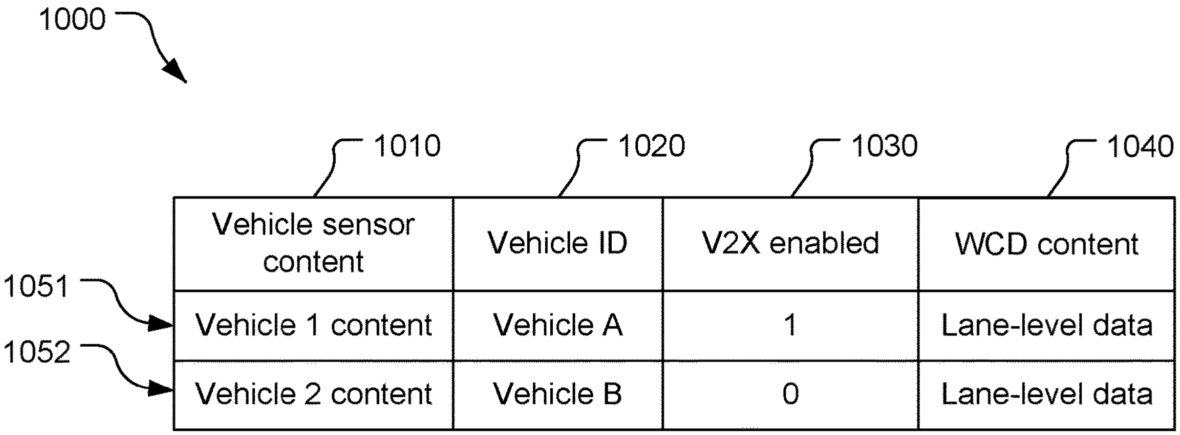
FIG. 10 is another example of an outbound communication signal shown in FIG. 7.

As another example of the device 705 producing the communication signal 726, the device 705 may treat the origin vehicle as a non-V2X vehicle. For example, in response to determining at sub-stage 722 that the vehicle 602 (the destination vehicle) cannot receive the communication signal 711 from the vehicle 601 (the origin vehicle), the device 705 may treat the vehicle 601 as a non-V2X vehicle and report sensor data for the vehicle 601 in a sensor sharing message, e.g., an SDSM (Sensor Data Sharing Message) or CPM (Collective Perception Message), and indicate whether the vehicle 601 is a V2X-enabled vehicle or not. For example, referring to FIG. 10, an outbound communication signal 1000 is an example of the communication signal 726 and includes a vehicle sensor content field 1010, a vehicle ID field 1020, a V2X enabled field 1030, and a WCD content field 1040. For each entry in the outbound communication signal 1000, here entries 1051, 1052, the vehicle sensor content field 1010 includes sensor measurement data from the respective vehicle, the identity of which is indicated in the vehicle ID field of the respective entry 1051, 1052. The V2X enabled field 1030 provides an indication of whether the respective vehicle is V2X enabled or not. For example, the V2X enabled field 1030 may be a binary field, with a "0" indicating that the corresponding vehicle is not V2X enabled and a "1" indicating that the corresponding vehicle is V2X enabled. In this example, Vehicle A is V2X enabled and Vehicle B is not. In the present specification of SDSM, V2X-enabled objects are not reported in SDSM. The destination vehicle may use the knowledge that a vehicle is a V2X-enabled vehicle by combining information provided in the outbound communication signal 1000 for the V2X-enabled vehicle with other information, e.g., information from a BSM, from the V2X-enabled vehicle when the V2X-enabled vehicle becomes LOS with the destination vehicle. This may improve tracking of the V2X-enabled vehicle, e.g., reducing a likelihood of a collision with the V2X-enabled vehicle. The WCD content field 1040 may include content provided by the wireless communication device 705. For example, the WCD content field 1040 may include information as to which lane the corresponding vehicle presently occupies. The destination vehicle, e.g., the vehicle 602, can use this lane-level information, map information, and the vehicle sensor content data to determine whether the origin vehicle is of interest, e.g., may pose a collision risk to the destination vehicle.

The wireless communication device 705 may be another vehicle (or a portion of a vehicle), and may determine whether to transmit the communication signal 726 by considering one or more factors that a stationary device may not consider. For example, the device 705 being a vehicle, the device 705 may consider a heading of the device 705 (e.g., relative to a destination vehicle) at sub-stage 724 to determine whether to transmit the signal 726. For example, the device 705 (e.g., the vehicle 603) may consider whether the device 705 can transmit the signal 726 in a desired direction with meaningful energy for adequate signal reception by a destination vehicle. If, for example, the device 705 is the vehicle 603, the device 705 may determine that the device 705 can adequately transmit the signal 726 toward the vehicle 602 or the vehicle 606, or that the device 705 can adequately transmit the signal 726 toward the vehicle 606 but not adequately transmit the signal 726 toward the vehicle 602, etc. This may be due, for example, to asymmetric transmission capability from the vehicle 603, e.g., due to different transmission capability from the port and starboard sides of the vehicle 603, e.g., due to different antennas of the device 705 and/or or due to a location of the device 705 within the vehicle 603 affecting signal transmission from the vehicle 603 differently in different directions (e.g., due to asymmetric path loss and/or interference)).

The wireless communication device 705 may produce the communication signal 726 differently based on whether the device 705 is facilitating information transfer between NLOS devices. For example, the device 705, being the vehicle 603, may include information regarding V2X-enabled vehicles (e.g., C-V2X-enabled vehicles) in an SDSM message transmitted by the device 705 based on the device 705 being in the intersection 650. Similar to the outbound communication signal 1000, such an SDSM signal may include a field indicating whether information corresponds to a V2X-enabled vehicle or a non-V2X-enabled vehicle.

There may be multiple vehicles that may possibly transmit the communication signal 726 (e.g., relay the signal 711 or at least content thereof) to facilitate information transfer between NLOS vehicles. For example, the vehicle 603 and the vehicle 605 may possibly serve as the device 705 and transmit the communication signal 726. If multiple possible devices are present to transmit the communication signal, then a redundancy mitigation technique may be employed to help prevent multiple transmissions of the same information (and thus help prevent redundant air traffic). For example, the multiple devices may implement an algorithm to determine whether content of the signal 711 has been transmitted by another device and, if so, to abstain from transmitting the communication signal 726 with the content of the signal 711. Thus, for example, if the vehicle 603 determines that the vehicle 605 has transmitted content of the signal 711 in the signal 726, then the vehicle 603 may abstain from transmitting another signal 726 including the content of the signal 711 (although the vehicle 603 may transmit another signal 726 with other content).

With multiple vehicles that may possibly transmit the communication signal 726 to facilitate information transfer between NLOS vehicles, one or more signal managers may be determined, e.g., selected, and be the vehicle(s) responsible for transmitting the communication signals 726 while other potential vehicles abstain from transmitting the communication signal 726 (e.g., relaying content of the signal 711). This may help avoid OTA congestion, interference, and/or failed information transfer due to excess transmission of the signal 726 (e.g., excess relaying of content of the signal 711). For example, a single vehicle in the intersection 650 may be selected for relaying content of the signal 711. As another example, multiple vehicles may be selected for transmission of the signal 726, e.g., with different vehicles selected for different reception and/or transmission directions. A signal manager may be selected based on one or more factors, e.g., vehicle heading (relative to the environment, e.g., the intersection 650), antenna capabilities (relative to the environment, e.g., the intersection 650), processing power, etc. A signal manager may hand off responsibility for transmission of the communication signal 726, e.g., based on the signal manager being unable (or expected to be unable) to effectively receive the signal 711 from the vehicle 601 and/or effectively transmit the signal 726 to the vehicle 602, e.g., losing LOS with one or more vehicles or expecting to lose LOS with one or more vehicles (e.g., leaving the intersection 650, or being about to leave the intersection 650).

Figure 11:
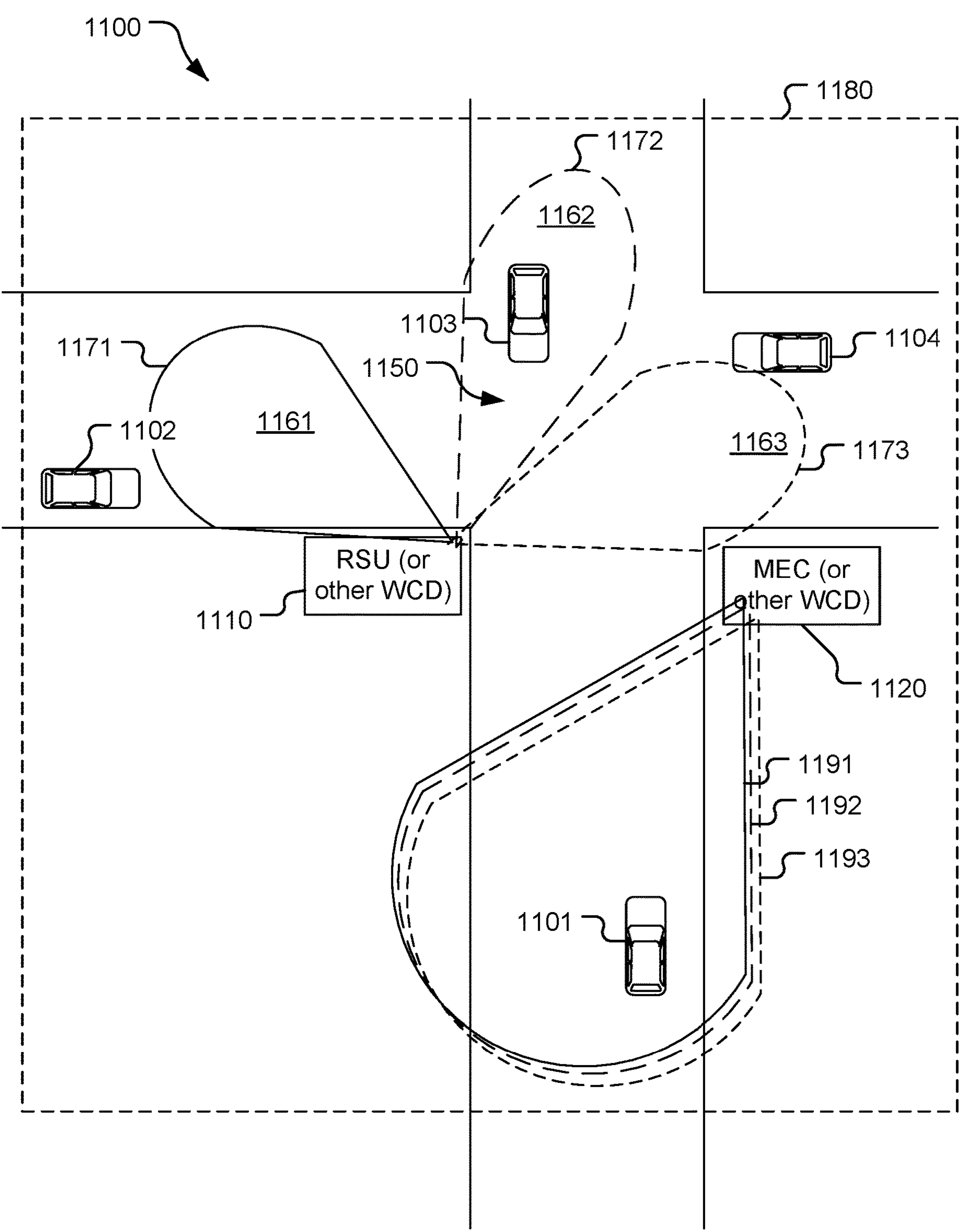
FIG. 11 is a diagram of another example wireless communication environment, including a mobile edge computing device.

Referring also to FIG. 11, a wireless communication environment 1100 includes multiple mobile wireless communication devices, here vehicles 1101, 1102, 1103, 1104, an RSU 1110, and an MEC 1120 (Mobile Edge Computing device). The RSU 1110 and the MEC 1120 are examples, and another type of wireless computing device may be used instead of the RSU 1110 and/or the MEC 1120. While the RSU 1110 is not connected to a core network (and communicates with the vehicles 1101-1104 directly, e.g., through the PC5 interface), the MEC 1120 is connected to the network core. The MEC 1120 has processing power and is connected to the core network (e.g., a cellular network), with fronthaul and backhaul communication capabilities. The RSU 1110 may be disposed at a location where multiple regions relative to the RSU 1110 are visible, with the multiple regions being non-line of sight (NLOS) with respect to each other. The RSU 1110 may be disposed based on geometry of the environment 1100, e.g., based on the physical characteristics of the environment 1100 and configuration of the RSU 1110 (e.g., where cameras are mounted, directionality of antennas, etc.) in order for the RSU 1110 to be able to collect data (e.g., receive signals, take measurements, capture images, etc.) from desired regions and transmit signals to desired regions. The MEC 1120 has directional antennas (e.g., mm-wave antennas) that can have beams directed based on the environment 1100, e.g., an intersection 1150 and roads connected to the intersection 1150. The RSU 1110 and the MEC 1120 may or may not be co-located (shown not being co-located in FIG. 11). The functionality of the RSU 1110 and the MEC 1120 may be provided in a single physical device.

The RSU 1110, and possibly the MEC 1120, are configured to obtain information regarding the environment 1100 and provide live feeds of the information over a network-to-mobile-device interface (e.g., Uu interface). The RSU 1110 is configured to obtain data from regions 1161, 1162, 1163. To obtain the data, the RSU 1110 may receive one or more communication signals and/or take one or more sensor measurements (e.g., capture one or more images) from one or more of the regions 1161-1163 through one or more fields of view 1171, 1172, 1173 corresponding to directional antennas and/or directional sensors. The RSU 1110 may obtain data from one or more other regions, but the regions 1161-1163 are shown as an example illustration as these regions may be relevant to the vehicle 1101 and, at least the regions 1161 and 1163, may not be visible to the vehicle 1101. The MEC 1120 may obtain information regarding the regions 1161-1163 from the RSU 1110 and/or using one or more antennas and/or one or more sensors of the MEC 1120.

The RSU 1110 and the MEC 1120 are configured to advertise and provide live feeds of collected information regarding the environment 1100. The RSU 1110 is configured to advertise links/URLs (Uniform Resource Locators) for live feeds of information for the regions 1161-1163. The RSU 1110 may transmit the links/URLs directly to vehicles, e.g., via the PC5 interface, along with indications of which region and/or direction each of the links/URLs corresponds (e.g., "For information west of the intersection 1150, use link (or URL) ABC."). Each of the links/URLs may correspond to one of the regions 1161-1163 and may correspond to a particular type of information for the region (e.g., image data, vehicle safety data such as BSM data, sensor measurement(s), etc.). Links for different resolutions within any of the regions 1161-1163, and/or links corresponding to finer resolutions than entire roads (e.g., individual lanes of a road) may be provided. A geofence 1180 may be established (e.g., around the RSU 1110) such that a recipient (e.g., a vehicle) may receive (e.g., obtain or use a link for) a live feed only when the recipient is within the geofence 1180. The MEC 1120 transmits beams 1191, 1192, 1193 with live feeds of information corresponding to the collected information corresponding to the regions 1161-1163, respectively. A receiving device, e.g., the vehicle 1101, may use one or more links/URLs to obtain collected information for one or more regions of interest. The collected information provided in the beams 1191-1193 may comprise various types of information such as safety data and/or images. The information in the beams 1191-1193 may be transmitted with reduced resolution, which may conserve processing power and/or help limit OTA congestion. For example, detailed images of vehicles may be replaced with simple boxes corresponding to portions of the images occupied by the vehicles. As another example, an object may not be shown as even a reduced-resolution image, but may be, for example, data indicating an area or volume occupied by the object. A vehicle receiving data regarding the object may indicate the occupied area or volume, e.g., as a span of angles relative to the vehicle and perhaps a distance from the vehicle. Information may be provided regarding reduced-resolution objects to differentiate between different types of objects, e.g., a box in an image may be identified as a car or a truck.

The vehicle 1101 (or other recipient of the collected information) may combine information from one or more of the live feeds, and/or may combine information (e.g., one or more images, safety information, etc.) from one or more antennas and/or one or more sensors (e.g., a camera) of the vehicle 1101 with information from one or more of the live feeds, to provide an enhanced field of view for the vehicle 1101. For example, an ADAS (Advanced Driver Assistance System) engine may determine whether to combine such information, e.g., based on distance to the intersection 1150, expected path trajectory, etc. The vehicle 1101 may produce a field of view (e.g., a 180° field of view, a 360° field of view, or other field of view) that includes combined information, e.g., images of other vehicles and/or reduced-resolution objects representative of other vehicles (e.g., boxes or polygons sized similarly to the vehicle image replaced by the box or polygon), vehicle data (e.g., direction, speed, distance from the vehicle 1101, etc.). The field of view may be graphical (which may help a user see potential objects of concern) and/or textual (e.g., numbers representing speed and distance, an indication of object heading, span of angles in the field of view occupied by another vehicle and distance to the other vehicle, etc.). A purely textual field of view may be used by the ADAS of the vehicle 1101, e.g., for collision avoidance (e.g., automatic braking, speed and/or heading adjustment, etc.) and/or one or one or more other functions.

Figure 12:
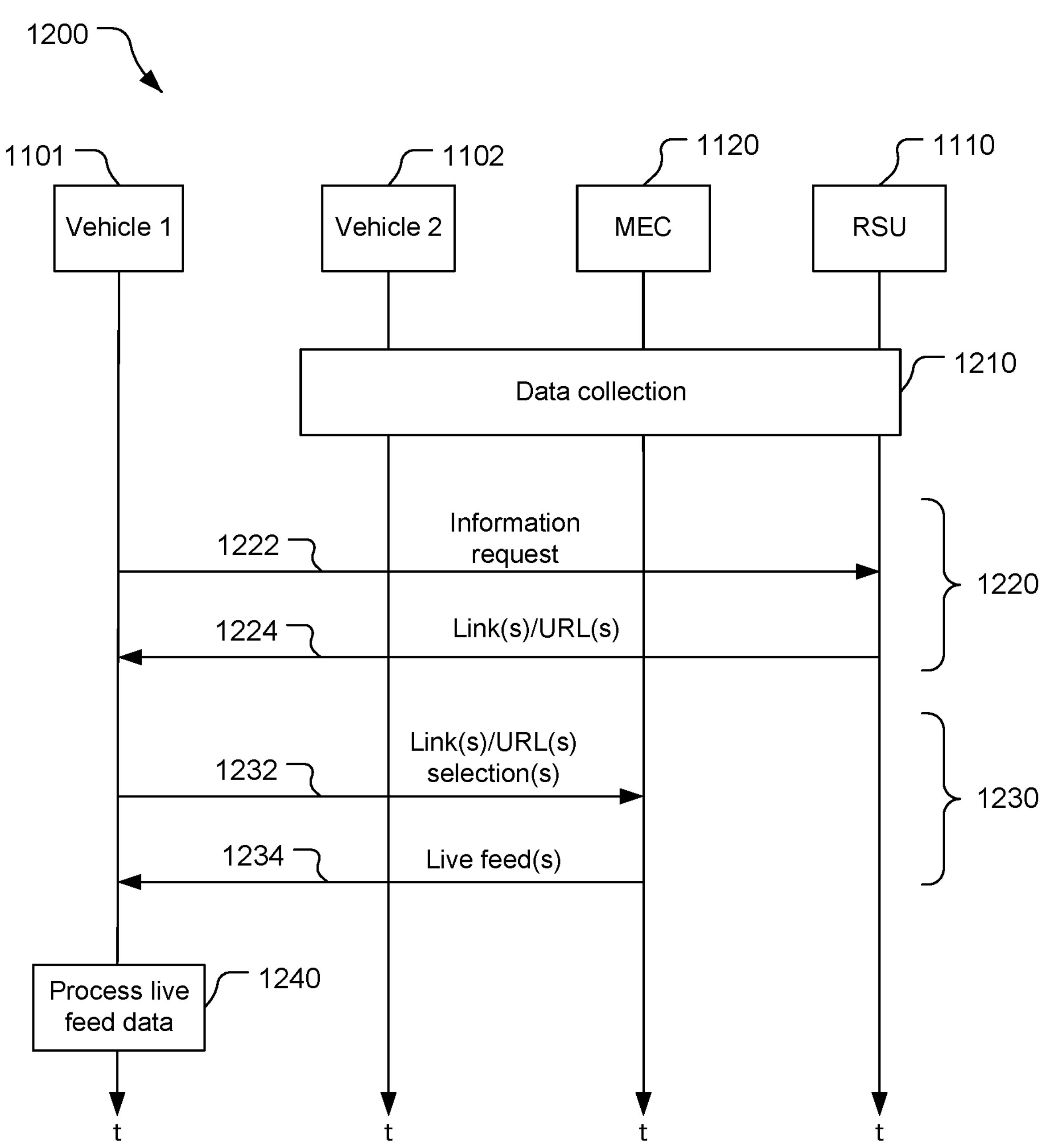
FIG. 12 is a processing and signal flow diagram of live-feed information transmission.

Referring to FIG. 12, with further reference to FIGS. 5 and 11, a signaling and process flow 1200 for live-feed information transmission and use includes the stages shown. The flow 1200 is an example of interaction between the vehicle 1101, the vehicle 1102, the RSU 1110, and the MEC 1120. The flow 1200 is an example, and may be altered. For example, stages may be added to the flow 1200, rearranged, and/or removed.

At stage 1210, the MEC 1120 collects data to be transmitted in one or more live feeds. The MEC 1120 may obtain data from one or more signals received by the MEC 1120, e.g., by one or more sensors, such as one or more receivers and/or one or more cameras, of the MEC 1120. The MEC 1120 (e.g., one or more antennas of the MEC 1120 and/or from a wired receiver of the MEC 1120) may receive one or more signals from the RSU 1110 and/or the vehicle 1102 (and/or other vehicles). The one or more signals may include information such as safety information, image data, one or more visible-light signals from which one or more images may be determined, etc.

At stage 1220, the RSU 1110 transmits one or more links and/or one or more URLs to the vehicle 1101 for receiving one or more live feeds of data collected at stage 1210. The vehicle 1101 may transmit an information request 1222 to the RSU 1110 for the link(s) and/or URL(s). The information request 1222 may, for example, request to receive and/or request access to vehicle information for one or more regions (e.g., one or more directions relative to the intersection 1150 and relevant to the vehicle 1101 (e.g., in the expected path of the vehicle 1101)). The RSU 1110 transmits (e.g., in response to the information request 1222, or without regard to receiving the information request 1222) one or more links and/or one or more URLs (and/or one or more other mechanisms) an access message 1224 for accessing live feeds of information collected by the MEC 1120. The access message 1224 may include link(s)/URL(s) corresponding to the information request 1222, or may include one or more further links and/or URLs (e.g., a full set of all available links/URLs, or the full set less any links/URLs corresponding to a region to which the access message 1224 is transmitted), or may include fewer links/URLs than requested by the information request 1222, or another set of mechanisms for accessing one or more live feeds of collected data.

At stage 1230, the MEC 1120 provides live feeds of collected data for respective regions. The vehicle 1101 may transmit an access selection 1232 of one or more links and/or of one or more URLs (and/or of one or more other mechanisms for accessing one or more live feeds) to the MEC 1120. In response to the access selection 1232, the MEC 1120 may transmit one or more live feeds 1234 to the vehicle 1101 (e.g., to a region containing the vehicle 1101) based on the access selection 1232. Also or alternatively, the MEC 1120 may transmit the live feed(s) 1234 to a region with the live feed(s) 1234 being for regions other than the region to which the live feeds are transmitted, and the vehicle 1101 may access one or more of the feeds by selecting one or more corresponding links and/or URLs. One or more of the live feeds 1234 may indicate that one or more objects in the live feed(s) is(are) capable of V2X communication.

At stage 1240, the vehicle 1101 processes the live feed(s) 1234. For example, the vehicle 1101 may provide the data from the live feed(s) to a user of the vehicle 1101 and/or to one or more components of the vehicle 1101, e.g., an ADAS. The vehicle 1101 may combine the live feed data with other data obtained by the vehicle, e.g., one or more images from one or more cameras of the vehicle 1101.

Figure 13:
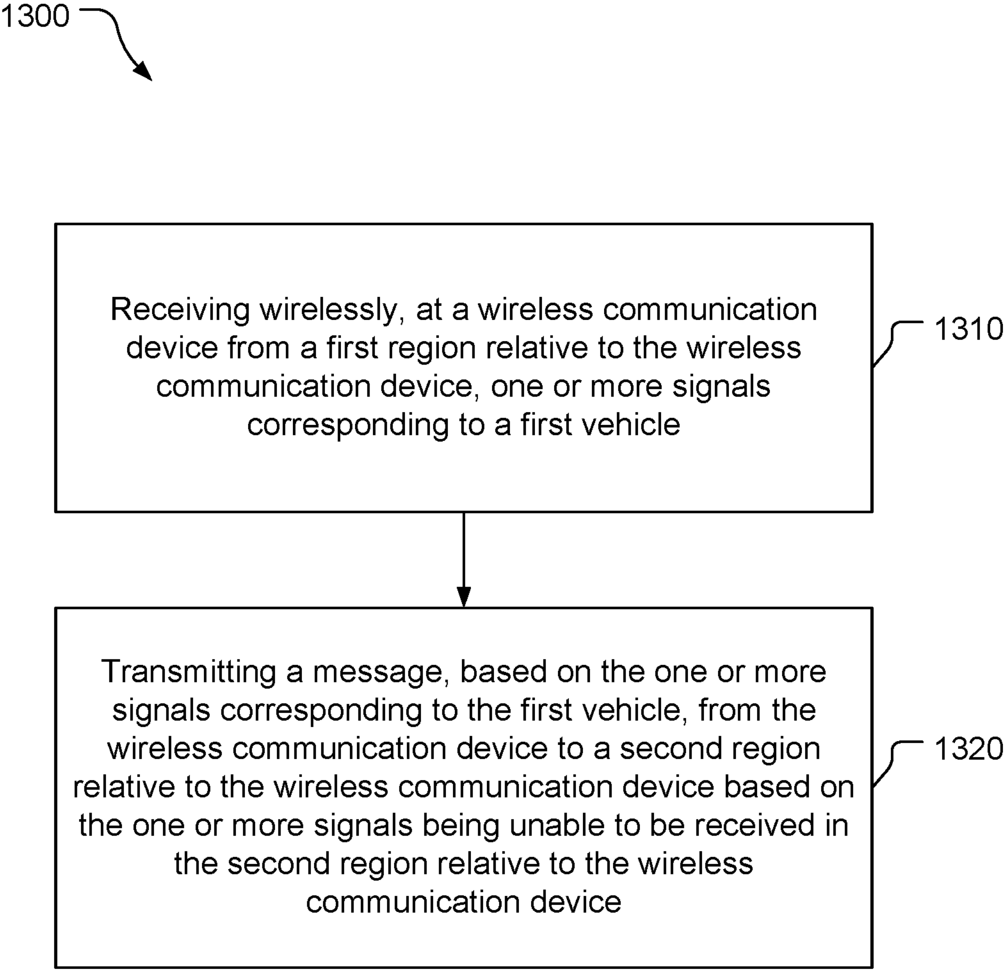
FIG. 13 is a block flow diagram of an example directional wireless message transmission method.

Referring to FIG. 13, with further reference to FIGS. 1-12, a directional wireless message transmission method 1300 includes the stages shown. The method 1300 is, however, an example and not limiting. The method 1300 may be altered, e.g., by having one or more stages added and/or one or more stages removed, and/or having stages rearranged, combined, and/or performed concurrently, and/or having one or more single stages split into multiple stages.

At stage 1310, the method 1300 includes receiving wirelessly, at a wireless communication device from a first region relative to the wireless communication device, one or more signals corresponding to a first vehicle. For example, the wireless communication device 705 may receive the communication signal 711 from the vehicle 601 at stage 710. As another example, the MEC 1120 may receive a signal (directly or indirectly) from the vehicle 1102 of one or more sensor measurements performed by the vehicle 1102 as part of the data collection at stage 1210. As another example, the wireless communication device 705 or the MEC 1120 may receive visible-light signals reflected by the vehicle 601 or the vehicle 1102, respectively. The processor 510, possibly in combination with the memory 530, possibly in combination with the transceiver 520 (e.g., one or more of the directional antennas 521, 522 and a wireless receiver such as the wireless receiver 344 or the wireless receiver 244), or possibly in combination with the sensor(s) 540 (e.g., one or more cameras), may comprise means for receiving the one or more signals.

At stage 1320, the method 1300 includes transmitting a message, based on the one or more signals corresponding to the first vehicle, from the wireless communication device to a second region relative to the wireless communication device based on the one or more signals being unable to be received in the second region relative to the wireless communication device. For example, the wireless communication device 705 may transmit the communication signal 726 toward the vehicle 602 at stage 720. The communication signal 726 may include a relayed BSM from the vehicle 601 and/or one or more indications (e.g., simplified image(s)) of a location of the vehicle 601. As another example, the MEC 1120 may transmit a live feed 1234 containing sensor measurement information from the vehicle 1102 toward the vehicle 1101 at stage 1230. As another example, the MEC 1120 may transmit image information and/or other information received from the wireless communication device 705. The processor 510, possibly in combination with the memory 530, in combination with the transceiver 520 (e.g., one or more of the directional antennas 521, 522 and a wireless transmitter such as the wireless transmitter 342 or the wireless transmitter 242) may comprise means for transmitting the second vehicle sensor message.

Implementations of the method 1300 may include one or more of the following features. In an example implementation, the one or more signals comprise a first vehicle sensor message indicative of one or more vehicle sensor measurements performed by the first vehicle, and the message comprises a second vehicle sensor message indicative of the one or more vehicle sensor measurements performed by the first vehicle. For example, the one or more signals may comprise a BSM and the message may comprise a relayed BSM. In a further example implementation, the second vehicle sensor message includes an indication that the first vehicle is capable of at least vehicle-to-vehicle communication. For example, the communication signal 726 may indicate whether a vehicle corresponding to sensor measurement information in the signal 726 is capable of V2X communication, e.g., similar to the outbound communication signal 1000. As another example, a live feed 1234 may indicate whether vehicles corresponding to information in the live feed 1234 are V2X enabled. In another further example implementation, the wireless communication device comprises a portion of a third vehicle and transmitting the second vehicle sensor message is performed based on absence of receiving, from another wireless communication device, a third vehicle sensor message indicative of the one or more vehicle sensor measurements performed by the first vehicle. For example, the wireless communication device 705 is the vehicle 603 (or a portion thereof) and the device 705 transmits the communication signal 726 with content from the signal 711 from the vehicle 601 based on that content having not been previously transmitted by another device (e.g., the vehicle 605). In another further example implementation, the wireless communication device comprises a portion of a third vehicle and the directional wireless message transmission method further comprises handing off responsibility for transmitting the second vehicle sensor message based on the third vehicle losing line of sight with at least one of the first vehicle or a second vehicle at least previously disposed in the second region relative to the wireless communication device. For example, the wireless communication device 705 is the vehicle 603 (or a portion thereof) and hands off responsibility for transmitting content of the signal 711 from the vehicle 601 based on the vehicle 603 losing LOS with the vehicle 602 (e.g., losing LOS with the region 630).

Also or alternatively, implementations of the method 1300 may include one or more of the following features. In an example implementation, the method 1300 includes determining, by the wireless communication device, that a second vehicle in the second region is unable to receive the one or more signals, wherein the wireless communication device transmits the message in response to determining that the second vehicle in the second region is unable to receive the one or more signals. For example, the wireless communication device 705 may transmit the communication signal 726 in response to determining, at sub-stage 722, that the vehicle 602 is unable to receive the communication signal 711 from the vehicle 601 (e.g., is predicted not to be able to decode the signal 711 accurately (e.g., receive the signal with adequate (e.g., above a threshold) power and adequate (e.g., above a threshold) SNR (signal-to-noise ratio))). As another example, the device 705 may transmit the communication signal 726 to the vehicle 602 in response to visible-light signals reflected by the vehicle 601 and measured at sub-stage 715 not being able to be (adequately) received by the vehicle 602. As another example, the MEC 1120 and/or the RSU 1110 may transmit a message (e.g., an SDSM, or CPM, or a URL, or live-feed link) in response to visible-light signals reflected by the vehicle 1101 not be able to be (adequately) received by the vehicle 1102. The processor 510, possibly in combination with the memory 520, may comprise means for determining that the second vehicle in the second region is unable to receive the first vehicle sensor message from the first vehicle. In another example implementation, the wireless communication device comprises a portion of a third vehicle and transmitting the message is based further on a heading of the third vehicle. For example, the wireless communication device 705 may, at sub-stage 724, determine whether to transmit the communication signal 726 based on a heading of the wireless communication device (e.g., as discussed above). In another example implementation, the method 1300 includes receiving wirelessly, at the wireless communication device from a fourth vehicle in the first region relative to the wireless communication device, a third vehicle sensor message indicative of one or more vehicle sensor measurements performed by the fourth vehicle, wherein the second vehicle sensor message is further indicative of the one or more vehicle sensor measurements performed by the fourth vehicle. For example, the wireless communication device 705 receives the communication signal 712 from the vehicle 604, aggregates content of the signal 712 with information from the signal 711, and transmits the communication signal 726 with vehicle sensor measurement content from both of the signals 711, 712 (e.g., the content 910 and the content 930).

Also or alternatively, implementations of the method 1300 may include one or more of the following features. In an example implementation, transmitting the message is based further on: a density of vehicles in the first region that are capable of at least vehicle-to-vehicle communication; or present motion of the first vehicle; or expected motion of the first vehicle; or signaling characteristics of an environment in which the wireless communication device is disposed; or a remaining portion of a lifetime of a first vehicle sensor message of the one or more signals; or a combination of two or more thereof. For example, at sub-stage 724, the wireless communication device 705 determines whether to transmit the communication signal 726 based on any of these factors (e.g., based on a value of the factor relative to a threshold for the factor) or based on any combination of two or more of these factors (e.g., based on values of the factors relative to thresholds for the factors, with either or both thresholds being different than the threshold if only one of the factors was considered).

Also or alternatively, implementations of the method 1300 may include one or more of the following features. In an example implementation, the method 1300 includes transmitting, from the wireless communication device to the second region relative to the wireless communication device via a mobile-device-to-terrestrial-radio-access-network interface, at least one running feed of vehicle activity in the first region relative to the wireless communication device. For example, the MEC 1120 transmits one or more of the beams 1191-1193 (using one or more directional antennas) to a region (as shown in FIG. 11, containing the vehicle 1101) with one or more corresponding live feeds of collected data regarding vehicle activity (if any) in the region 1161. The processor 510, possibly in combination with the memory 530, in combination with the transceiver 520 (e.g., one or more of the directional antennas 521, 522 and a wireless transmitter such as the wireless transmitter 342) may comprise means for transmitting the at least one running feed of vehicle activity. In another example implementation, the one or more signals comprise visible-light signals and the message includes lane-level information regarding a location of the first vehicle. For example, the device 705 (or the RSU 1110 or the MEC 1120) may capture one or more images of the vehicle 601 (or the vehicle 1102) and transmit the signal 726 (or another signal) to the vehicle 602 (or the vehicle 1101) indicating a lane occupied by the vehicle 601 (or the vehicle 1102).

Implementation Examples

Implementation examples are provided in the following numbered clauses.

Clause 1. A directional wireless message transmission method comprising:

receiving wirelessly, at a wireless communication device from a first region relative to the wireless communication device, one or more signals corresponding to a first vehicle; and transmitting a message, based on the one or more signals corresponding to the first vehicle, from the wireless communication device to a second region relative to the wireless communication device based on the one or more signals being unable to be received in the second region relative to the wireless communication device.

Clause 2. The directional wireless message transmission method of clause 1, wherein the one or more signals comprise a first vehicle sensor message indicative of one or more vehicle sensor measurements performed by the first vehicle, and the message comprises a second vehicle sensor message indicative of the one or more vehicle sensor measurements performed by the first vehicle.

Clause 3. The directional wireless message transmission method of clause 2, wherein the second vehicle sensor message includes an indication that the first vehicle is capable of at least vehicle-to-vehicle communication.

Clause 4. The directional wireless message transmission method of clause 2, wherein the wireless communication device comprises a portion of a third vehicle and transmitting the second vehicle sensor message is performed based on absence of receiving, from another wireless communication device, a third vehicle sensor message indicative of the one or more vehicle sensor measurements performed by the first vehicle.

Clause 5. The directional wireless message transmission method of clause 2, wherein the wireless communication device comprises a portion of a third vehicle and the directional wireless message transmission method further comprises handing off responsibility for transmitting the second vehicle sensor message based on the third vehicle losing line of sight with at least one of the first vehicle or a second vehicle at least previously disposed in the second region relative to the wireless communication device.

Clause 6. The directional wireless message transmission method of clause 1, further comprising determining, by the wireless communication device, that a second vehicle in the second region is unable to receive the one or more signals, wherein the wireless communication device transmits the message in response to determining that the second vehicle in the second region is unable to receive the one or more signals.

Clause 7. The directional wireless message transmission method of clause 1, wherein the wireless communication device comprises a portion of a third vehicle and wherein transmitting the message is based further on a heading of the third vehicle.

Clause 8. The directional wireless message transmission method of clause 1, wherein transmitting the message is based further on:

a density of vehicles in the first region that are capable of at least vehicle-to-vehicle communication; or present motion of the first vehicle; or expected motion of the first vehicle; or signaling characteristics of an environment in which the wireless communication device is disposed; or a remaining portion of a lifetime of a first vehicle sensor message of the one or more signals; or a combination of two or more thereof Clause 9. The directional wireless message transmission method of clause 1, further comprising transmitting, from the wireless communication device to the second region relative to the wireless communication device via a mobile-device-to-terrestrial-radio-access-network interface, at least one running feed of vehicle activity in the first region relative to the wireless communication device.

Clause 10. The directional wireless message transmission method of clause 1, wherein the one or more signals comprise visible-light signals and the message includes lane-level information regarding a location of the first vehicle.

Clause 11. A wireless communication device comprising:

a memory;

a transceiver including a first directional antenna and a second directional antenna; and a processor communicatively coupled to the memory and the transceiver and configured to:

receive, via the first directional antenna from a first region relative to the wireless communication device, one or more signals corresponding to a first vehicle; and transmit, via the second directional antenna toward a second region relative to the wireless communication device, a message based on the one or more signals corresponding to the first vehicle, wherein the processor is configured to transmit the message based on the one or more signals being unable to be received in the second region relative to the wireless communication device.

Clause 12. The wireless communication device of clause 11, wherein the one or more signals comprise a first vehicle sensor message indicative of one or more vehicle sensor measurements performed by the first vehicle, and the message comprises a second vehicle sensor message indicative of the one or more vehicle sensor measurements performed by the first vehicle.

Clause 13. The wireless communication device of clause 12, wherein the second vehicle sensor message includes an indication that the first vehicle is capable of at least vehicle-to-vehicle communication.

Clause 14. The wireless communication device of clause 12, wherein the wireless communication device comprises a portion of a vehicle and the processor is configured to transmit the second vehicle sensor message based on absence of receiving, from another wireless communication device, a third vehicle sensor message indicative of the one or more vehicle sensor measurements performed by the first vehicle.

Clause 15. The wireless communication device of clause 12, wherein the wireless communication device comprises a portion of a third vehicle and the processor is configured to hand off responsibility for transmitting the second vehicle sensor message based on the third vehicle losing line of sight with at least one of the first vehicle or a second vehicle at least previously disposed in the second region relative to the wireless communication device.

Clause 16. The wireless communication device of clause 11, wherein the processor is further configured to determine that a second vehicle in the second region is unable to receive the one or more signals, and wherein the processor is configured to transmit the message in response to determining that the second vehicle in the second region is unable to receive the one or more signals.

Clause 17. The wireless communication device of clause 11, wherein the wireless communication device comprises a portion of a third vehicle and wherein the processor is configured to transmit the message based further on a heading of the third vehicle.

Clause 18. The wireless communication device of clause 11, wherein the processor is configured to transmit the message based further on:

a density of vehicles in the first region that are capable of at least vehicle-to-vehicle communication; or present motion of the first vehicle; or expected motion of the first vehicle; or signaling characteristics of an environment in which the wireless communication device is disposed; or a remaining portion of a lifetime of a first vehicle sensor message of the one or more signals; or a combination of two or more thereof Clause 19. The wireless communication device of clause 11, wherein the processor is configured to transmit, via the second directional antenna to the second region relative to the wireless communication device via a mobile-device-to-terrestrial-radio-access-network interface, at least one running feed of vehicle activity in the first region relative to the wireless communication device.

Clause 20. The wireless communication device of clause 11, wherein the one or more signals comprise visible-light signals and the message includes lane-level information regarding a location of the first vehicle.

Clause 21. A wireless communication device comprising:

means for wirelessly receiving, from a first region relative to the wireless communication device, one or more signals corresponding to a first vehicle; and means for transmitting a message, based on the one or more signals corresponding to the first vehicle, from the wireless communication device to a second region relative to the wireless communication device based on the one or more signals being unable to be received in the second region relative to the wireless communication device.

Clause 22. The wireless communication device of clause 21, wherein the one or more signals comprise a first vehicle sensor message indicative of one or more vehicle sensor measurements performed by the first vehicle, and the message comprises a second vehicle sensor message indicative of the one or more vehicle sensor measurements performed by the first vehicle.

Clause 23. The wireless communication device of clause 22, wherein the second vehicle sensor message includes an indication that the first vehicle is capable of at least vehicle-to-vehicle communication.

Clause 24. The wireless communication device of clause 22, wherein the wireless communication device comprises a portion of a third vehicle and the means for transmitting the second vehicle sensor message comprise means for transmitting the second vehicle sensor message based on absence of receiving, from another wireless communication device, a third vehicle sensor message indicative of the one or more vehicle sensor measurements performed by the first vehicle.

Clause 25. The wireless communication device of clause 22, wherein the wireless communication device comprises a portion of a third vehicle, and the wireless communication device further comprises means for handing off responsibility for transmitting the second vehicle sensor message based on the third vehicle losing line of sight with at least one of the first vehicle or a second vehicle at least previously disposed in the second region relative to the wireless communication device.

Clause 26. The wireless communication device of clause 21, further comprising means for determining that a second vehicle in the second region is unable to receive the one or more signals, wherein the means for transmitting the message comprise means for transmitting the message in response to determining that the second vehicle in the second region is unable to receive the one or more signals.

Clause 27. The wireless communication device of clause 21, wherein the wireless communication device comprises a portion of a third vehicle and wherein the means for transmitting the message comprise means for transmitting the message based further on a heading of the third vehicle.

Clause 28. The wireless communication device of clause 21, wherein the means for transmitting the message comprise means for transmitting the message based further on:

a density of vehicles in the first region that are capable of at least vehicle-to-vehicle communication; or present motion of the first vehicle; or expected motion of the first vehicle; or signaling characteristics of an environment in which the wireless communication device is disposed; or a remaining portion of a lifetime of a first vehicle sensor message of the one or more signals; or a combination of two or more thereof Clause 29. The wireless communication device of clause 21, further comprising means for transmitting, to the second region relative to the wireless communication device via a mobile-device-to-terrestrial-radio-access-network interface, at least one running feed of vehicle activity in the first region relative to the wireless communication device.

Clause 30. The wireless communication device of clause 21, wherein the one or more signals comprise visible-light signals and the message includes lane-level information regarding a location of the first vehicle.

Clause 31. A non-transitory, processor-readable storage medium comprising processor-readable instructions to cause a processor of a wireless communication device to:

receive wirelessly, from a first region relative to the wireless communication device, one or more signals corresponding to a first vehicle; and transmit a message, based on the one or more signals corresponding to the first vehicle, from the wireless communication device to a second region relative to the wireless communication device based on the one or more signals being unable to be received in the second region relative to the wireless communication device.

Clause 32. The non-transitory, processor-readable storage medium of clause 31, wherein the one or more signals comprise a first vehicle sensor message indicative of one or more vehicle sensor measurements performed by the first vehicle, and the message comprises a second vehicle sensor message indicative of the one or more vehicle sensor measurements performed by the first vehicle.

Clause 33. The non-transitory, processor-readable storage medium of clause 32, wherein the second vehicle sensor message includes an indication that the first vehicle is capable of at least vehicle-to-vehicle communication.

Clause 34. The non-transitory, processor-readable storage medium of clause 32, wherein the wireless communication device comprises a portion of a third vehicle and the processor-readable instructions to cause the processor to transmit the second vehicle sensor message comprise processor-readable instructions to cause the processor to transmit the second vehicle sensor message based on absence of receiving, from another wireless communication device, a third vehicle sensor message indicative of the one or more vehicle sensor measurements performed by the first vehicle.

Clause 35. The non-transitory, processor-readable storage medium of clause 32, wherein the wireless communication device comprises a portion of a third vehicle, and the wireless communication device further comprises processor-readable instructions to cause the processor to hand off responsibility for transmitting the second vehicle sensor message based on the third vehicle losing line of sight with at least one of the first vehicle or a second vehicle at least previously disposed in the second region relative to the wireless communication device.

Clause 36. The non-transitory, processor-readable storage medium of clause 31, further comprising processor-readable instructions to cause the processor to determine that a second vehicle in the second region is unable to receive the one or more signals, wherein the processor-readable instructions to cause the processor to transmit the message comprise processor-readable instructions to cause the processor to transmit the message in response to determining that the second vehicle in the second region is unable to receive the one or more signals.

Clause 37. The non-transitory, processor-readable storage medium of clause 31, wherein the wireless communication device comprises a portion of a third vehicle and wherein the processor-readable instructions to cause the processor to transmit the message comprise processor-readable instructions to cause the processor to transmit the message based further on a heading of the third vehicle.

Clause 38. The non-transitory, processor-readable storage medium of clause 32, wherein the processor-readable instructions to cause the processor to transmit the message comprise processor-readable instructions to cause the processor to transmit the message based further on:

a density of vehicles in the first region that are capable of at least vehicle-to-vehicle communication; or present motion of the first vehicle; or expected motion of the first vehicle; or signaling characteristics of an environment in which the wireless communication device is disposed; or a remaining portion of a lifetime of a first vehicle sensor message of the one or more signals; or a combination of two or more thereof Clause 39. The non-transitory, processor-readable storage medium of clause 31, further comprising processor-readable instructions to cause the processor to transmit, to the second region relative to the wireless communication device via a mobile-device-to-terrestrial-radio-access-network interface, at least one running feed of vehicle activity in the first region relative to the wireless communication device.

Clause 40. The non-transitory, processor-readable storage medium of clause 31, wherein the one or more signals comprise visible-light signals and the message includes lane-level information regarding a location of the first vehicle.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices (also called wireless communications devices). A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A directional wireless message transmission method comprising:

receiving wirelessly, at a wireless communication device from a first region relative to the wireless communication device, one or more signals corresponding to a first vehicle; and transmitting a message, based on the one or more signals corresponding to the first vehicle, from the wireless communication device to a second region relative to the wireless communication device based on the one or more signals being unable to be received in the second region relative to the wireless communication device, wherein transmitting the message is based further on:

a density of vehicles in the first region that are capable of at least vehicle-to-vehicle communication; or present motion of the first vehicle; or expected motion of the first vehicle; or signaling characteristics of an environment in which the wireless communication device is disposed; or a remaining portion of a lifetime of a first vehicle sensor message of the one or more signals; or a combination of two or more thereof.

2. The directional wireless message transmission method of claim 1, wherein the one or more signals comprise a first vehicle sensor message indicative of one or more vehicle sensor measurements performed by the first vehicle, and the message comprises a second vehicle sensor message indicative of the one or more vehicle sensor measurements performed by the first vehicle.

3. The directional wireless message transmission method of claim 2, wherein the second vehicle sensor message includes an indication that the first vehicle is capable of at least vehicle-to-vehicle communication.

4. The directional wireless message transmission method of claim 2, wherein the wireless communication device comprises a portion of a third vehicle and transmitting the second vehicle sensor message is performed based on absence of receiving, from another wireless communication device, a third vehicle sensor message indicative of the one or more vehicle sensor measurements performed by the first vehicle.

5. The directional wireless message transmission method of claim 2, wherein the wireless communication device comprises a portion of a third vehicle and the directional wireless message transmission method further comprises handing off responsibility for transmitting the second vehicle sensor message based on the third vehicle losing line of sight with at least one of the first vehicle or a second vehicle at least previously disposed in the second region relative to the wireless communication device.

6. The directional wireless message transmission method of claim 1, further comprising determining, by the wireless communication device, that a second vehicle in the second region is unable to receive the one or more signals, wherein the wireless communication device transmits the message in response to determining that the second vehicle in the second region is unable to receive the one or more signals.

7. The directional wireless message transmission method of claim 1, wherein the wireless communication device comprises a portion of a third vehicle and wherein transmitting the message is based further on a heading of the third vehicle.

8. The directional wireless message transmission method of claim 1, further comprising transmitting, from the wireless communication device to the second region relative to the wireless communication device via a mobile-device-to-terrestrial-radio-access-network interface, at least one running feed of vehicle activity in the first region relative to the wireless communication device.

9. The directional wireless message transmission method of claim 1, wherein the one or more signals comprise visible-light signals and the message includes lane-level information regarding a location of the first vehicle.

10. A wireless communication device comprising:
- a memory;
- a transceiver including a first directional antenna and a second directional antenna; and
- a processor communicatively coupled to the memory and the transceiver and configured to:
  - receive, via the first directional antenna from a first region relative to the wireless communication device, one or more signals corresponding to a first vehicle; and
- transmit, via the second directional antenna toward a second region relative to the wireless communication device, a message based on the one or more signals corresponding to the first vehicle, wherein the processor is configured to transmit the message based on the one or more signals being unable to be received in the second region relative to the wireless communication device,
- wherein the processor is configured to transmit the message based further on:
  - a density of vehicles in the first region that are capable of at least vehicle-to-vehicle communication; or
  - present motion of the first vehicle; or
  - expected motion of the first vehicle; or
  - signaling characteristics of an environment in which the wireless communication device is disposed; or
- a remaining portion of a lifetime of a first vehicle sensor message of the one or more signals; or
- a combination of two or more thereof.

11. The wireless communication device of claim 10, wherein the one or more signals comprise a first vehicle sensor message indicative of one or more vehicle sensor measurements performed by the first vehicle, and the message comprises a second vehicle sensor message indicative of the one or more vehicle sensor measurements performed by the first vehicle.

12. The wireless communication device of claim 11, wherein the second vehicle sensor message includes an indication that the first vehicle is capable of at least vehicle-to-vehicle communication.

13. The wireless communication device of claim 11, wherein the wireless communication device comprises a portion of a vehicle and the processor is configured to transmit the second vehicle sensor message based on absence of receiving, from another wireless communication device, a third vehicle sensor message indicative of the one or more vehicle sensor measurements performed by the first vehicle.

14. The wireless communication device of claim 11, wherein the wireless communication device comprises a portion of a third vehicle and the processor is configured to hand off responsibility for transmitting the second vehicle sensor message based on the third vehicle losing line of sight with at least one of the first vehicle or a second vehicle at least previously disposed in the second region relative to the wireless communication device.

15. The wireless communication device of claim 10, wherein the processor is further configured to determine that a second vehicle in the second region is unable to receive the one or more signals, and wherein the processor is configured to transmit the message in response to determining that the second vehicle in the second region is unable to receive the one or more signals.

16. The wireless communication device of claim 10, wherein the wireless communication device comprises a portion of a third vehicle and wherein the processor is configured to transmit the message based further on a heading of the third vehicle.

17. The wireless communication device of claim 10, wherein the processor is configured to transmit, via the second directional antenna to the second region relative to the wireless communication device via a mobile-device-to-terrestrial-radio-access-network interface, at least one running feed of vehicle activity in the first region relative to the wireless communication device.

18. The wireless communication device of claim 10, wherein the one or more signals comprise visible-light signals and the message includes lane-level information regarding a location of the first vehicle.

19. A wireless communication device comprising:
- means for wirelessly receiving, from a first region relative to the wireless communication device, one or more signals corresponding to a first vehicle; and
- means for transmitting a message, based on the one or more signals corresponding to the first vehicle, from the wireless communication device to a second region relative to the wireless communication device based on the one or more signals being unable to be received in the second region relative to the wireless communication device, wherein the means for transmitting the message comprise means for transmitting the message based further on:

a density of vehicles in the first region that are capable of at least vehicle-to-vehicle communication; or present motion of the first vehicle; or expected motion of the first vehicle; or signaling characteristics of an environment in which the wireless communication device is disposed; or a remaining portion of a lifetime of a first vehicle sensor message of the one or more signals; or a combination of two or more thereof.

20. The wireless communication device of claim 19, wherein the one or more signals comprise a first vehicle sensor message indicative of one or more vehicle sensor measurements performed by the first vehicle, and the message comprises a second vehicle sensor message indicative of the one or more vehicle sensor measurements performed by the first vehicle.

21. The wireless communication device of claim 20, wherein the second vehicle sensor message includes an indication that the first vehicle is capable of at least vehicle-to-vehicle communication.

22. The wireless communication device of claim 20, wherein the wireless communication device comprises a portion of a third vehicle and the means for transmitting the second vehicle sensor message comprise means for transmitting the second vehicle sensor message based on absence of receiving, from another wireless communication device, a third vehicle sensor message indicative of the one or more vehicle sensor measurements performed by the first vehicle.

23. The wireless communication device of claim 20, wherein the wireless communication device comprises a portion of a third vehicle, and the wireless communication device further comprises means for handing off responsibility for transmitting the second vehicle sensor message based on the third vehicle losing line of sight with at least one of the first vehicle or a second vehicle at least previously disposed in the second region relative to the wireless communication device.

24. The wireless communication device of claim 19, further comprising means for determining that a second vehicle in the second region is unable to receive the one or more signals, wherein the means for transmitting the message comprise means for transmitting the message in response to determining that the second vehicle in the second region is unable to receive the one or more signals.

25. The wireless communication device of claim 19, wherein the wireless communication device comprises a portion of a third vehicle and wherein the means for transmitting the message comprise means for transmitting the message based further on a heading of the third vehicle.

26. The wireless communication device of claim 19, wherein the means for transmitting the message comprise means for transmitting the message based further on:

a density of vehicles in the first region that are capable of at least vehicle-to-vehicle communication; or present motion of the first vehicle; or expected motion of the first vehicle; or signaling characteristics of an environment in which the wireless communication device is disposed; or a remaining portion of a lifetime of a first vehicle sensor message of the one or more signals; or a combination of two or more thereof.

27. The wireless communication device of claim 19, further comprising means for transmitting, to the second region relative to the wireless communication device via a mobile-device-to-terrestrial-radio-access-network interface, at least one running feed of vehicle activity in the first region relative to the wireless communication device.

28. A non-transitory, processor-readable storage medium comprising processor-readable instructions to cause a processor of a wireless communication device to:

receive wirelessly, from a first region relative to the wireless communication device, one or more signals corresponding to a first vehicle; and transmit a message, based on the one or more signals corresponding to the first vehicle, from the wireless communication device to a second region relative to the wireless communication device based on the one or more signals being unable to be received in the second region relative to the wireless communication device, wherein transmitting the message is based further on:

a density of vehicles in the first region that are capable of at least vehicle-to-vehicle communication; or present motion of the first vehicle; or expected motion of the first vehicle; or signaling characteristics of an environment in which the wireless communication device is disposed; or a remaining portion of a lifetime of a first vehicle sensor message of the one or more signals; or a combination of two or more thereof.

* * * * *